United States Patent [19]

Clarke, Jr. et al.

[11] 3,850,674
[45] Nov. 26, 1974

[54] METHOD OF COATING A FIBERGLASS LAMINATE AND THE COATED LAMINATE

[75] Inventors: Gail H. Clarke, Jr., Guilford; Ralph A. Colafati, III, New Haven, both of Conn.

[73] Assignee: Olin Corporation, New Haven, Conn.

[22] Filed: Apr. 30, 1973

[21] Appl. No.: 355,990

[52] U.S. Cl......... 117/76 T, 117/126 GB, 244/133, 260/79, 260/80.77, 260/87.5 A, 260/87.7
[51] Int. Cl. ..................... B32b 17/04, C08f 29/16
[58] Field of Search .... 117/126 GB, 76 T; 161/189, 161/204

[56] References Cited
UNITED STATES PATENTS

| 2,961,341 | 11/1960 | Long | 117/126 GB X |
|---|---|---|---|
| 2,968,649 | 1/1961 | Pailthorp et al. | 260/45.7 R X |
| 2,983,624 | 5/1961 | Thompson | 117/126 GB X |
| 3,025,183 | 3/1962 | Yuan | 117/126 GB |
| 3,041,316 | 6/1962 | Griffin | 260/79 |
| 3,056,767 | 10/1962 | Pailthorp et al. | 117/126 GB X |

Primary Examiner—Ralph Husack
Attorney, Agent, or Firm—Robert L. Andersen

[57] ABSTRACT

The present invention relates to coatings based on copolymers of hexafluoropropylene and vinylidene fluoride and on terpolymers of tetrafluorethylene, vinylidene fluoride and hexafluoropropylene, and to a method for applying the same to provide a coating which is curable at room temperature, which resists peeling when applied to fiberglass laminates and which is highly resistant to erosion by wind, rain and hail. In accordance with the invention, a primer of uncrosslinked low molecular weight copolymer having a Mooney Viscosity of 25-40 and provided with active crosslink sites is first applied to the substrate. A top coat is applied over the primer, said top coat containing copolymer or terpolymer provided with active crosslink sites and a crosslink agent.

7 Claims, No Drawings

METHOD OF COATING A FIBERGLASS LAMINATE AND THE COATED LAMINATE

BACKGROUND

1. Field of Invention

This invention relates to fluorinated hydrocarbon coatings and in particular to coatings suitable for use on high speed aircraft where coatings are subjected to extreme erosion by wind, rain and hail. More particularly, the invention provides a method for applying to fiberglass laminates coatings based on copolymers of hexafluoropropylene and vinylidene fluoride, and on terpolymers of tetrafluoroethylene, vinylidene fluoride and hexafluoropropylene, wherein improved coatings are obtained by first priming the fiberglass laminate with an uncrosslinked copolymer of hexafluoropropylene and vinylidene fluoride which has been provided with active crosslink sites.

2. Prior Art

U.S. Pat. No. 3,041,316 provides a process for producing a room temperature curable rubbery copolymer of hexafluoropropylene and vinylidene fluoride wherein the copolymer is modified with an amine at elevated temperature and is crosslinked with mercapto compound at room temperature. The patent teaches preparation of the vulcanized product, but fails to teach how to use the material as a coating where its durability is critical such as under extreme weathering conditions found in exterior aircraft applications.

U.S. Pat. No. 2,968,649 provides a terpolymer of tetrafluoroethylene, vinylidene fluoride and hexafluoropropylene and teaches its use as a coating for fiberglass to protect fuel cells for aircraft. Like the preceding patent, this patent contains no information on how to utilize these materials to form satisfactory coatings for use in the aircraft industry.

We have found that when the polymers of these patents are applied as coatings to fiberglass laminates and cured at temperatures ranging from ambient temperatures of about 60° up to about 400°F., the coating does not adhere well to the substrate, but tends to peel off when subjected to dynamic testing conditions and thus to expose the substrate to the very erosion it was designed to protect against. To develop adequate adhesion, it is necessary to cure the coating at or above temperatures of 400°F. It has been determined, by dynamic testing under conditions simulating rain erosion at speeds of about 500 miles per hour, that curing at such temperatures causes the coating to harden and become sufficiently brittle that it loses much of its ability to resist wind, rain and hail erosion.

Thus, while such coatings do not peel after being subjected to temperatures, they fail to meet erosion resistance requirements after having been cured at such temperatures. Conversely, if they are cured at lower temperatures they satisfy erosion resistance requirements but fail to adequately adhere to the substrate.

The present invention is, therefore, directed to a method for applying coatings based on these polymers, to the coating formed thereby, and particularly to a method whereby these polymers can be utilized to provide satisfactory coatings which are cured at temperatures below 400°F. without sacrificing adhesion or erosion resistance.

SUMMARY OF THE INVENTION

We have discovered that fiberglass laminates may be coated with coating materials based on copolymers of hexafluoropropylene and vinylidene or on a terpolymer of tetrafluoroethylene, vinylidene fluoride and hexafluoropropylene to provide a coating having the desired properties by first coating the laminate with a primer comprising an uncrosslinked hexafluoropropylene-vinylidene fluoride copolymer which has been provided with active crosslink sites and which has a Mooney Viscosity of 25-40.

Thereafter, a freshly prepared top coat is applied to the primed laminate, the top coat comprising a mixture of 100 parts by weight of a polymer which has been provided with active crosslink sites, said polymer being selected from the group consisting of a copolymer of hexafluoropropylene and vinylidene fluoride and a terpolymer of tetrafluoroethylene, vinylidene fluoride and hexafluoropropylene, and 1-5 parts by weight crosslinking agent. The coating thus formed is then cured for at least 2 hours at a temperature of 60°-350°F.

Thus, the invention comprises the method of coating fiberglass laminates, the coating formed thereby, and fiberglass laminates coated in accordance with the invention.

DETAILED DESCRIPTION

Materials suitable for use in the primer and coatings of the present invention include copolymers of hexafluoropropylene and vinylidene fluoride and terpolymers of tetrafluoroethylene, vinylidene fluoride and hexafluoropropylene. These polymers are commercially available from E. I. du Pont de Nemours & Co. under the trademark "Viton".

Viton A, as described in U.S. Pat. No. 3,041,316 is a copolymer of hexafluoropropylene and vinylidene fluoride having a molecular weight of about 60,000 and a monomer ratio of about 30% vinylidene fluoride and 70% hexafluoropropylene. This polymer has a Mooney Viscosity of 50 to 55. It is desirable for purposes of the present invention for the copolymer of the primer to have a molecular weight below 60,000 preferably in the range of 25,000 to 50,000 and a Mooney Viscosity in the range of 25 to 40 preferably about 35. Viton A 35 (DuPont) is a copolymer of hexafluoropropylene and vinylidene fluoride having maximum Mooney Viscosity of 35 and is the preferred material for use in the primer of the present invention.

Materials suitable for use as a basis for top coats to be applied over the primer include copolymers of hexafluoropropylene and vinylidene fluoride having a Mooney Viscosity in excess of about 30. Viton A 35 is again preferred, but Viton A or other suitable copolymers may also be used to equal advantage.

Terpolymers of tetrafluoroethylene, vinylidene fluoride and hexafluoropropylene, described in U.S. Pat. No. 2,968,649, are also suitable for use as a basis for top coats to be applied over the primer coat. These terpolymers, sold commercially under the designation "Viton B" by E. I. du Pont de Nemours & Co., contain 3-35% by weight tetrafluoroethylene units and 65-97% by weight vinylidene fluoride and hexafluoropropylene units in a weight ratio of 2.33:1 to 0.667:1, respectively, and have a Mooney Viscosity of 50-70, preferably 65-70.

The hexafluoropropylene-vinylidene fluoride copolymer selected for use in the primer is first treated with an amine at elevated temperature to provide a modified copolymer having chemically reactive crosslink sites thereon. Amines suitable for this purpose include ethylamine, propylamine, allylamine, diethylamine, diisopropylamine, di-n-butylamine, diamylamine, diisobutylamine, di-n-octylamine, diallylamine, triethylamine, tripropylamine, triamylamine and tetramethylguanidine. Diallylamine is preferred. Suitably 0.5 to 2 parts by weight of diallylamine is utilized for each 100 parts of polymer. A suitable quantity of pigment, for example, carbon black, may also be incorporated into the mixture.

The amine is reacted with the copolymer for at least one hour in the presence of 5–20% by weight alkaline earth metal oxide, preferably MgO. MgO reacts with water to form $Mg(OH)_2$ which, if left in the reaction mixture, tends to react with vinylidene fluoride to increase double bond formation which has a deleterous effect on the coating. Accordingly, the reaction is conducted at a temperature of 225° to 400°, preferably 275°–325° to volatilize water and thus reduce the water content of the reaction mixture. The reaction may be conducted at any desired pressure and pressures from atmospheric to 8000 psi have proven satisfactory. The modified copolymer is thereby provided with chemically active crosslink sites which provide the basis for formation of a good bond between the primer and subsequent top coats. The primer, however, is not itself crosslinked.

The modified uncrosslinked copolymer is then cooled and incorporated into a suitable solvent and one or more coats is sprayed or painted on the substrate by known means. Suitable solvents for the modified copolymer include organic solvents such as dimethyl ether, methyl ethyl ketone, combinations thereof, or any other suitable solvent for the modified copolymer. While the primer may suitably contain 5–50% by weight of modified copolymer, 10–30% is preferred.

The copolymer which has been provided with active crosslink sites by reaction with a suitable amine, is stable and can be immediately incorporated into a solvent and used or stored, or it may be stored for later mixing with solvent. Applicant has stored the copolymer-solvent mixture for as long as ten months prior to using without adversely affecting the coating.

The initial steps in preparing of the copolymer or terpolymer to be applied as a top coat over the primer are the same as those employed for the primer. The copolymer or terpolymer is reacted with the amine, a pigment, if desired, and an alkali metal oxide, such as MgO, at a temperature in the range of 225°F. to 400°F. to provide a modified copolymer or terpolymer having active crosslink sites.

Prior to use, the modified copolymer or terpolymer is incorporated into a solvent, suitably dimethyl ether, methyl ethyl ketone or combinations thereof, in a concentration of 5–50% by weight, preferably 10–30% by weight. Prior to applying as a top coat, suitably 5 minutes to 8 hours before, but preferably 15 minutes to 1 hour before, a suitable mercapto compound is added as a crosslinking agent to the modified polymer-solvent mixture at ambient temperature. Suitable crosslinking agents include hexamethylene dithiol, glycol dimercaptoacetate, piperazine N,N-dimethyl hexamethylene diamine and pentaerythritol tetramercaptoprionate.

One or more top coats are then applied at spaced intervals and the resulting coating is cured at a temperature in the range of 60–350°F. for a period exceeding 2 hours preferably 4 hours to 7 days.

Crosslinking of the modified copolymer or terpolymer begins upon addition of the mercapto compound so that the polymer is partially, but not completely crosslinked when the coating is sprayed over the primer coat. Crosslinking continues throughout the curing period. It is believed that utilizing a partially crosslinked coating causes this coating to crosslink with the previously uncrosslinked primer to produce excellent adhesion between primer and the coating applied thereto.

The uncrosslinked polymer in turn forms a better bond with the substrate than is obtained with a crosslinked primer and surprisingly this bond is not damaged when the top coat is bonded to the primer. Thus, a superior bond is obtained between top coat and primer on the one hand and between primer and substrate on the other hand to provide a composite coating with superior peel resistance without sacrificing erosion resistance.

Substrates suitable for use with coatings of the present invention include fiberglass laminates in general and specifically such laminates as polyester/fiberglass, epoxy/fiberglass, polyimide/fiberglass, polyimide/quartz, polyimide/graphite and epoxy/graphite.

Having thus fully described our invention, reference is now made to the accompanying examples demonstrating the practice and superiority of our invention.

EXAMPLE I

100 Gms Viton A 35, 5 gms carbon black, and 15 gms magnesium oxide were blended together with 1 gm diallylamine and reacted in a stainless steel mold at 300°F. and 8000 psi for 3 hours to produce a derivative which has active crosslink sites but which is not crosslinked. The modified polymer was cooled to ambient temperature and 480 grams thereof were dissolved in a mixture of 1632 gms dimethyl ether and 1088 gms methyl ethyl ketone to produce a mixture containing about 15% by weight modified polymer. To each 100 parts of the 15% mixture, 1.1 parts by weight of pentaerythritol tetramercaptoprionate in methyl ethyl ketone solvent was added. The mixture was shaken for two minutes and sprayed on an epoxy-fiberglass laminate. The coating was cured under the conditions shown in Table I.

Rain erosion performance was tested utilizing a rain ring and a whirling arm to supply a sample velocity of 500 miles per hour. Simulated rainfall was provided as the environment at 1 inch per hour. Results are reported in Table I in terms of the mode of failure of the coating. Coatings failing by virtue of adhesion losses are not acceptable for aircraft applications. Where adhesion was not the cause of failure time to failure by erosion is indicated to determine decreases in erosion performance under the stated conditions.

TABLE I

| Cure Time (Hrs.) | Cure Temp (°F.) | Failure Mode | Time (Minutes) | 180° Peel Str. (p/i) |
|---|---|---|---|---|
| 168 | 75 | Adhesion | — | 4 max. |
| 4 | 300 | do. | — | 5 max. |
| 2 | 400 | do. | — | 5.6 max. |
| 24 | 400 | Erosion | 26 | 6 min. |

To confirm these findings, the coatings were subjected to 180° peel strength tests utilizing an Instron tensile testing machine. A jaw separation of 2 inches per minute was utilized. Results are reported in Table I as maximum and minimum peel strengths measured in pounds per inch of peel (p/i). Acceptable coatings have a minimum peel strength of 6 p/i minimum.

Only the coating cured at 400°F. for 24 hours showed satisfactory resistance to adhesion failures.

EXAMPLE II

Viton B (DuPont) was prepared, applied and tested as stated in Example I. Results are reported in Table II.

TABLE II

| Cure Time (Hrs.) | Cure Temp. (°F.) | Failure Mode | Time (Minutes) | 180° Peel Str. (p/i) |
|---|---|---|---|---|
| 8-24 | 212 | Adhesion | — | 4.6 |
| 8-24 | 300 | do. | — | 4.6 max. |
| 4 | 400 | do. | — | 4.6 max. |
| 8 | 400 | do. | — | 5 max. |
| 16 | 400 | Erosion | 14 | 6 min. |

As in Example I, adhesion was not sufficient unless the coating was cured at 400°F. for approximately 16 hours. Under these conditions the erosion resistance was substantially impaired. The coating was brittle and was eroded through to the substrate when subjected to the erosion test for about 14 minutes.

EXAMPLE III

A 15% solution of Viton A 35 copolymer was prepared as in Example I. A first portion of this mixture was sprayed as a primer on 2 sets of epoxy-fiberglass sheets utilizing a Devilbiss MCB 510 spray gun equipped with a number 56 air cap. To 100 parts by weight of a second portion was added 2.8 parts by weight pentaerythritol tetramercaptoproprionate (PTM). The PTM-copolymer mixture was shaken for 2 minutes, was sprayed on a first set of primed fiberglass sheets and successive coats were applied at 15 minute intervals until a total coating thickness of 12–14 mils was achieved. The samples were tested as described in Example I and results are reported as Sample A of Table III.

To the second set of primed fiberglass sheets, Viton B was applied as a top coat after having been formulated in the same manner as Viton A. These samples were similarly tested and the results thereof are reported as Sample B of Table III.

TABLE III

| Sample | Cure Time (Hrs.) | Cure Temp. (°F.) | Failure Mode | Time (Minutes) | 180° Peel Str. (p/i) |
|---|---|---|---|---|---|
| A | 168 | 75 | Erosion | 40 | 6 min |
|   | 4 | 300 | do. | — | 10 min. |
|   | 24 | 400 | do. | 28 | 6 min. |
| B | 4 | 300 | do. | — | 6 min. |

Lack of adhesion was not a problem when the laminate was primed with a copolymer of hexafluoropropylene and vinylidene fluoride having a low Mooney Viscosity, even when the coating was cured at room temperature. However, while curing at room temperature produces very satisfactory erosion resistance, curing at 400°F. for 24 hours produced less satisfactory erosion failure times due to the brittle nature of the coating resulting from the high temperature cure.

What is claimed is:

1. In a method of treating a fiberglass laminate to provide a coating thereon having improved peel and erosion resistance, wherein said laminate is coated with a polymer selected from the group consisting of copolymers of hexafluoropropylene and vinylidene fluoride and terpolymers of tetrafluoroethylene, vinylidene fluoride and hexafluoropropylene and thereafter cured for at least 2 hours at a temperature of 60°–350°F., the improvement comprising:

first coating said laminate with a primer comprising an uncrosslinked hexafluoropropylene-vinylidene fluoride copolymer which has been provided with active crosslink sites and which has a Mooney Viscosity of 25–40.

2. The method of claim 1 wherein the copolymer of said primer has a monomer ratio of about 30% vinylidene fluoride and 70% hexafluoropropylene.

3. The method of claim 1 wherein the copolymer of said primer has a molecular weight of 25,000 to 50,000.

4. The method of claim 1 wherein the copolymer of said primer has a Mooney Viscosity of 30–35.

5. The method of claim 1 wherein active crosslink sites are provided by reacting the copolymer of said primer with an amine selected from the group consisting of ethylamine, propylamine, allylamine, diethylamine, diisopropylamine, di-n-butylamine, diamylamine, diisobutylamine, di-n-octylamine, diallylamine, triethylamine, tripropylamine, triamylamine and tetramethylguanidine at a temperature of 225°–325°F.

6. The method of claim 5 wherein the polymer selected from said group is a co-polymer of hexafluoropropylene and vinylidene fluoride having a monomer ratio of about 70% hexafluoropropylene and about 30% vinylidene fluoride.

7. A coated fiberglass laminate produced by the method of claim 6.

* * * * *